United States Patent
Kanthasamy

(10) Patent No.: US 9,323,869 B1
(45) Date of Patent: Apr. 26, 2016

(54) MESH-BASED SHAPE OPTIMIZATION SYSTEMS AND METHODS

(71) Applicant: MSC.Software Corporation, Santa Ana, CA (US)

(72) Inventor: Kunaseelan Kanthasamy, Irvine, CA (US)

(73) Assignee: MSC.Software Corporation, Newport Beach, CA (US)

( * ) Notice: Subject to any disclaimer, the term of this patent is extended or adjusted under 35 U.S.C. 154(b) by 419 days.

(21) Appl. No.: 13/864,147

(22) Filed: Apr. 16, 2013

(51) Int. Cl.
G06F 17/50 (2006.01)

(52) U.S. Cl.
CPC ............ *G06F 17/50* (2013.01); *G06F 17/5018* (2013.01); *G06F 17/5009* (2013.01); *G06F 2217/16* (2013.01)

(58) Field of Classification Search
None
See application file for complete search history.

(56) References Cited

U.S. PATENT DOCUMENTS

| | | | |
|---|---|---|---|
| 7,275,023 B2 * | 9/2007 | Chen et al. | 703/2 |
| 7,392,163 B1 * | 6/2008 | Bindeman | 703/2 |
| 8,269,771 B2 * | 9/2012 | Oh | G06T 17/20 345/419 |
| 8,548,782 B2 * | 10/2013 | Hsu et al. | 703/9 |
| 8,881,392 B2 * | 11/2014 | Derrien et al. | 29/889 |
| 8,942,963 B1 * | 1/2015 | Kanthasamy | G06F 17/5009 703/6 |
| 8,970,590 B1 * | 3/2015 | Brennan | G06T 17/20 345/419 |
| 2003/0222871 A1 * | 12/2003 | Brombolich | 345/427 |
| 2006/0103648 A1 * | 5/2006 | Wu | G06F 17/5018 345/423 |
| 2006/0173658 A1 * | 8/2006 | Korsmeyer | 703/2 |
| 2007/0188490 A1 * | 8/2007 | Kanai et al. | 345/423 |
| 2007/0233436 A1 * | 10/2007 | Ishikawa | 703/2 |
| 2008/0071505 A1 * | 3/2008 | Huang et al. | 703/2 |
| 2008/0183436 A1 * | 7/2008 | Chen | G06F 17/5018 703/1 |
| 2009/0040224 A1 * | 2/2009 | Igarashi | G06T 19/00 345/427 |
| 2009/0248374 A1 * | 10/2009 | Huang et al. | 703/2 |
| 2010/0095526 A1 * | 4/2010 | Derrien et al. | 29/889.1 |
| 2010/0262406 A1 * | 10/2010 | Goel | G06F 17/5095 703/2 |
| 2012/0053716 A1 * | 3/2012 | Bickel et al. | 700/98 |
| 2012/0269434 A1 * | 10/2012 | Atkins | B42D 1/08 382/175 |

* cited by examiner

*Primary Examiner* — Kibrom K Gebresilassie
(74) *Attorney, Agent, or Firm* — Foley & Lardner LLP

(57) ABSTRACT

A system and method for shape optimization that includes receiving information regarding a model that represents one or more physical objects to be manufactured, the information comprises a finite element mesh, geometric parameters, geometric constraints, and manufacturing constraints of the model and generating a morphed mesh that results in an updated finite element mesh in order to meet specified model characteristics. The method further includes generating the morphed mesh by displacing nodes located at the boundary regions of the model and determining a displacement of interior nodes of the finite element mesh using an interpolation of boundary node displacement.

19 Claims, 8 Drawing Sheets

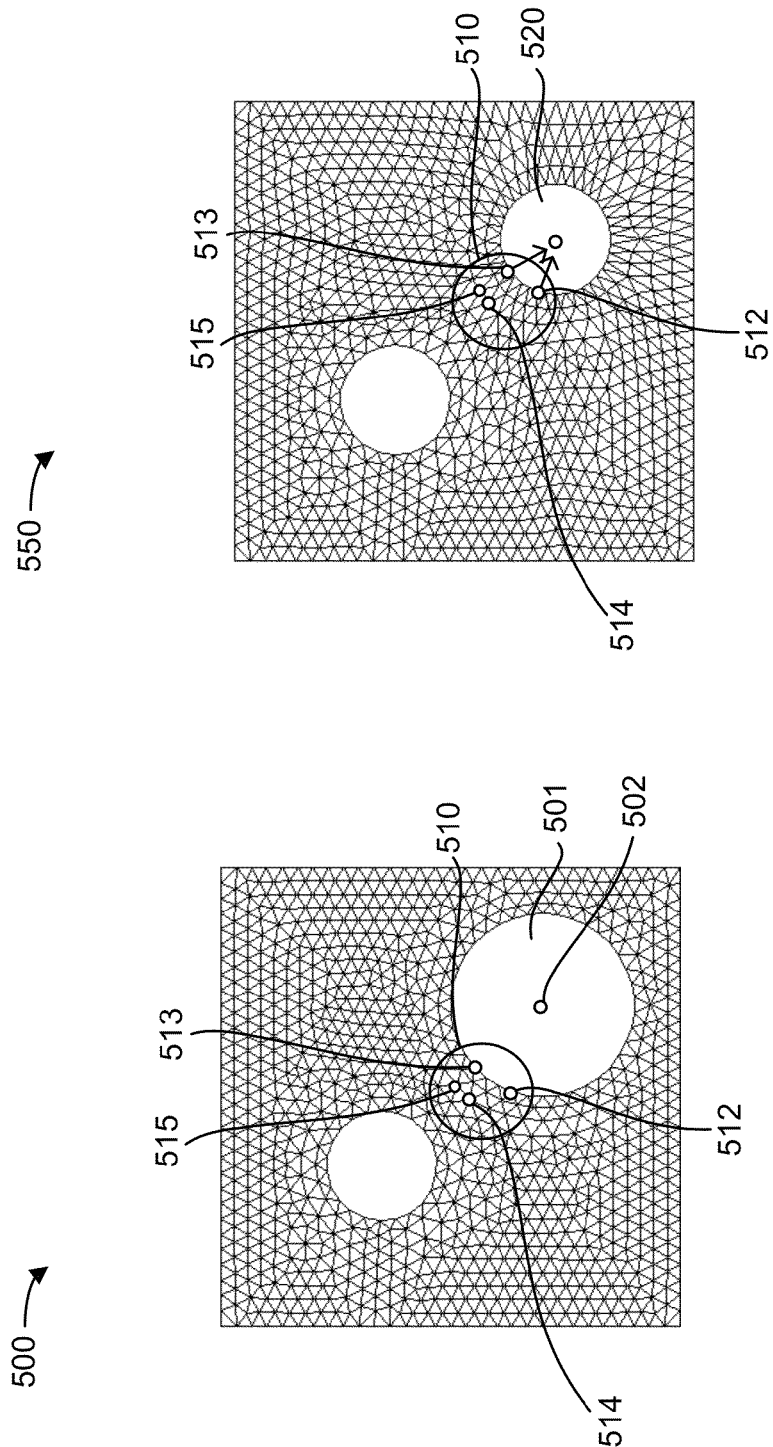

MESH-BASED SHAPE OPTIMIZATION SYSTEMS AND METHODS

BACKGROUND

The present disclosure generally relates to computer-aided engineering (CAE) systems. The present disclosure relates more specifically to shape optimization by morphing a mesh in CAE systems.

Shape optimization of a CAD model in CAE systems may yield peculiar results. Mesh parameterization is used to optimize the mesh of the model. In such an approach, using mesh parameterization, a shape basis vector is provided as in input to the finite element analysis (FEA) solver of the CAE system. The solver produces an optimized shape represented as a mesh that is imported back into the CAD model. The geometry, topology, features, and parameters of the CAD model is reconstructed from the mesh. It may take significant time, effort, and cost to reconstruct the CAD model in such a manner. Further, the CAD model may fail to meet design constraints. A system and method for fully integrating the CAD-based design, mesh morphing/generation, FEA, and shape optimization processes is described in greater detail below.

SUMMARY

One embodiment relates to systems and methods that include shape optimization that includes receiving information regarding a model that represents one or more physical objects to be manufactured, the information comprises a finite element mesh, geometric parameters, geometric constraints, and manufacturing constraints of the model and generating a morphed mesh that results in an updated finite element mesh in order to meet specified model characteristics. The method further includes generating the morphed mesh by displacing nodes located at the boundary regions of the model and determining a displacement of interior nodes of the finite element mesh using an interpolation of boundary node displacement.

A mesh generation system that has a processing circuit that is configured to receive information regarding a model that represents one or more physical objects to be manufactured, the information comprises a finite element mesh, geometric parameters, geometric constraints, and manufacturing constraints of the model and generate a morphed mesh that results in an updated finite element mesh in order to meet specified model characteristics. The system further includes the capability to generate the morphed mesh by displacing nodes located at the boundary regions of the model and determining a displacement of interior nodes of the finite element mesh using an interpolation of boundary node displacement.

Yet another embodiment relates to a computer-readable storage medium having machine instructions stored therein, the instructions being executable by a processor to cause the processor to perform operations includes receiving information regarding a model that represents one or more physical objects to be manufactured, the information comprises a finite element mesh, geometric parameters, geometric constraints, and manufacturing constraints of the model and generating a morphed mesh that results in an updated finite element mesh in order to meet specified model characteristics. The method further includes generating the morphed mesh by displacing nodes located at the boundary regions of the model and determining a displacement of interior nodes of the finite element mesh using an interpolation of boundary node displacement.

BRIEF DESCRIPTION OF THE FIGURES

The disclosure will become more fully understood from the following detailed description, taken in conjunction with the accompanying figures, wherein like reference numerals refer to like elements, in which:

FIG. 5A illustrates a mesh of a model that is to be optimized, according to an exemplary embodiment;

FIG. 5B illustrates a morphed mesh of the CAD model from FIG. 5A, according to an exemplary embodiment;

DETAILED DESCRIPTION OF THE EXEMPLARY EMBODIMENTS

Figure 1:
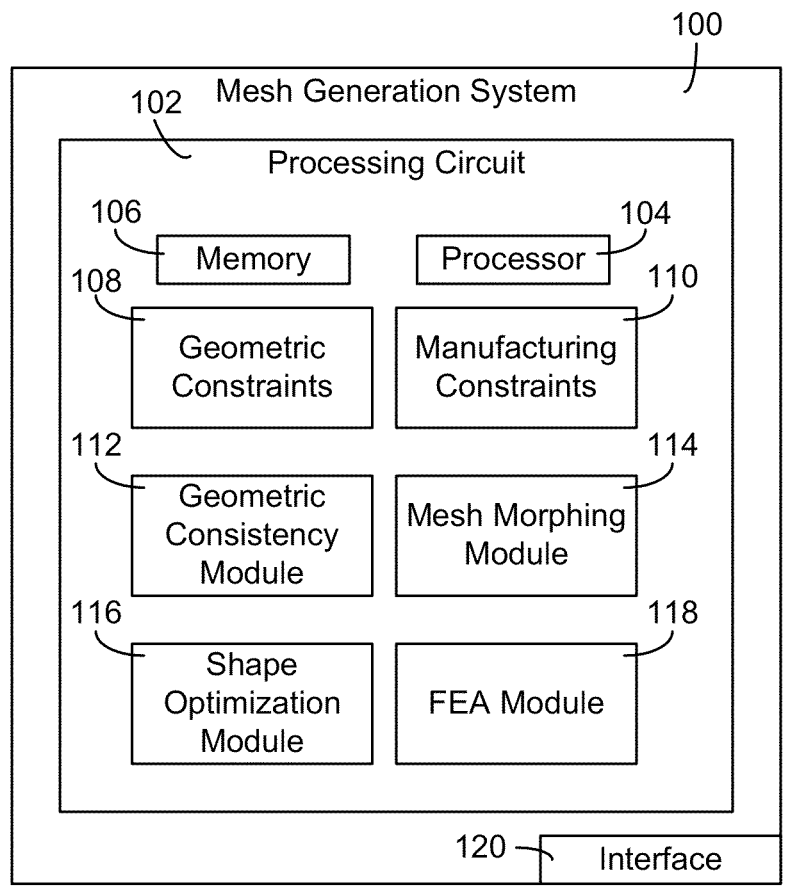
FIG. 1 is a block diagram of a mesh generation system, according to an exemplary embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, systems and methods for integrated design, mesh morphing and generation, finite element analysis, and shape optimization in a CAE system are shown and described. The systems and methods herein may be used to optimize a CAD/CAE model design. Parameters of the CAD model may be modified based on the finite element analysis and shape optimization in order to minimize the objective functions for the design (e.g., to optimize the design with respect to user provided parameters). The parameters (e.g. shape, strength, size, weight, etc.) of the model may be modified while maintaining a bi-directional association between the geometry of the model and the mesh of the model. Such a process may maintain the shape, constraints and geometric features of the model.

The modification of the parameters may include morphing the mesh of the CAD model. The morphing may be based on a weighted displacement interpolation. For example, for a mesh of a model, boundary nodes associated with a shape that is to be modified may be moved, and an interpolation between the displacement of the boundary nodes and the other nodes (i.e. interior nodes) of the mesh may be determined. The other nodes may be moved based on the interpolation. The weighting of the interpolation may be a uniform weighting, a weighting based on the distance between nodes, or a weighting based on an inverse of a distance between nodes.

The result of the modification of the parameters using interpolation may be an optimized model, with geometry, topology, features, parameters, constraints, attributes, and other information, that may be provided to the CAE system. The optimized model may comply with design constraints, knowledge-based constraints for the model and manufacturing constraints. For example, the modification of the mesh of the model may be performed such that geometric constraints and manufacturing constraints of the model are met, and that the design of the optimized model is feasible in practice. The result of the modification preserves the shapes and/or the distinct features of the model. By using the systems and methods herein, a model may be modified without the need to reconstruct the mesh of the model.

Referring to FIG. 1, a block diagram of a mesh generation system 100 is shown. Mesh generation system 100 may be part of a CAE system or computer-aided design (CAD) system. Mesh generation system 100 may be generally configured to receive a CAD model being designed using the CAE system or CAD system. The model may be designed by a user of the CAE system or CAD system, and may include any number of modifications. Mesh generation system 100 may receive the CAD model with the modifications and optimize the CAD model such that the modifications do not compromise the CAD model or change the geometric constraints of the model.

Mesh generation system 100 may be configured to perform a shape optimization process that modifies the finite element mesh without changing the geometry, geometric constraints, or manufacturing constraints of the model. Mesh generation system 100 may receive the finite element mesh, along with its geometry and any constraints, and may provide an updated or morphed finite element mesh back to the CAE system or CAD system.

Mesh generation system 100 may be used to improve the quality of the finite element mesh of the CAD model. Mesh generation system 100 may generally be used to smooth out the finite element mesh by modifying the location of the nodes of the mesh such that the geometric properties of the CAD model are maintained that allows the shape of the model to be optimized. Shape optimization may be performed to optimize particular properties of the model. Properties, such as but not limited to, weight, length, width tensile strength, load handling, flexibility, and so on may be optimized.

Mesh generation system 100 is shown to include a processing circuit 102 including a processor 104 and memory 106 which may be part of a work station or other computer. Processor 104 may be implemented as a general purpose processor, an application specific integrated circuit (ASIC), one or more field programmable gate arrays (FPGAs), a group of processing components, or other suitable electronic processing components. Memory 106 is one or more devices (e.g., RAM, ROM, Flash memory, hard disk storage, etc.) for storing data and/or computer code for completing and/or facilitating the various processes described herein. Memory 106 may be or include non-transient volatile memory or non-volatile memory or non-transitory computer readable storage media. Memory 106 may include database components, object code components, script components, or any other type of information structure for supporting the various activities and information structures described herein. Memory 106 may be communicably connected to processor 104 and includes computer code or instructions for executing one or more processes described herein.

Processing circuit 102 is shown to include various modules for executing the activities described herein. Processing circuit 102 may include a geometric constraint module 108 and manufacturing constraint module 110. Modules 108, 110 may generally relate to geometric constraints and manufacturing constraints that relate to a model that represents a physical object that is to be manufactured. For example, geometric constraints may relate to geometric features of the model such as holes, cylinders, chamfers, etc. The geometric constraints may define the geometric properties to be maintained in the model in one embodiment. Manufacturing constraints may relate to constraints associated with the creation of the design of the model. For example, manufacturing constraints may be used to determine whether it is feasible to create the model in a real-world setting. Modules 108, 110 may store geometric constraints and manufacturing constraints and/or receive the constraints from an outside source in one embodiment.

Processing circuit 102 may include a geometric consistency module 112. Geometric consistency module 112 may receive the CAD model, including the geometry of the model, the finite element mesh of the model, the geometric and manufacturing constraints, topology, attributes, and other information related to the CAD model. Geometric consistency module 112 may determine that the geometric properties of the CAD model and the finite element mesh of the model are consistent with each other. For example, a user may create a CAD model and later modify the CAD model by altering a size of a shape (e.g., by reducing the size of a circular feature as shown in FIGS. 8A-B and 9A-B). Geometric consistency module 112 may receive the CAD model including the geometric properties and finite element mesh of the model after the modification, and may determine when the two are consistent with one another. The consistency may relate to the shape of the feature (e.g., a circular shape was maintained in the finite element mesh without the circle morphing into an oval shape), the preservation of features around the modified area (e.g., a change in size of a circular shape did not compromise other shapes and node positions in the finite element mesh), etc. Maintaining the shape of feature may include defining the nodes located at the edge of a feature to be unchangeable such that they are configured to move as group relative to one or more other nodes or points in one embodiment. For example, the nodes at the end of a circular shape may move relative to the center of the circular features. In some embodiments, the user may be provided with the option to chose nodes whose shape should be maintained during shape optimization.

Geometry consistency module 112 may determine that the CAD model to be self-consistent (e.g., the geometric properties of the model are consistent with the mesh), and the mesh generation system 100 may not morph and smooth out the mesh. Mesh generation system 100 may provide an indication to the rest of the CAE system that no further mesh modification is needed.

When the CAD model is geometrically inconsistent, mesh generation system 100 may be configured to morph and smooth out the finite element mesh of the CAD model before performing finite element analysis (FEA) on the CAD model. Significant deformations that cause the geometric inconsistency may cause a poor quality of the CAD model, inverted elements (e.g., nodes) during the FEA of the mesh, and other problems. A mesh morphing module 114 may be used to update node coordinates that address the deformations in the finite element mesh. FEA module 118 may receive the updated mesh for the FEA process.

Processing circuit 102 is shown to include a mesh morphing module 114 configured to update node coordinates in the finite element mesh. The mesh morphing procedure may generally include identifying nodes associated with a mesh feature (e.g., a shape) that is geometrically inconsistent with the geometry of the CAD model. Mesh morphing module 114 may be configured to calculate a topologically consistent morphing operator on the finite element mesh. The morphing operator may be representative of a shift in node positions in the mesh.

The morphing operator may be based on a calculated weighted displacement interpolation on a plurality of nodes of the finite element mesh. Mesh morphing module 114 may be configured to determine boundary nodes of a shape or feature in the mesh to be moved. After moving the boundary nodes of the shape or feature into new locations, weighted displacement interpolation may be used to determine a displacement for interior nodes (e.g., non-boundary nodes) of the shape or feature, and the interior nodes may be moved based on the displacement. The process of weighted displacement interpolation is described in greater detail in FIGS. 4 and 5A-B. The output of mesh morphing module 114 may be a morphed mesh of the CAD model. Mesh morphing module 114 may be configured to morph various types of meshes and mesh elements at the same time (e.g., triangular, quadrilateral, tetrahedral, prism, or hexahedral elements in a mesh).

Using the morphed mesh, shape optimization may be performed on the CAD model. Shape optimization module 116 may be configured to use the morphed mesh to generate an updated finite element mesh for the CAD model.

The updated finite element mesh may be provided to the geometry consistency module 112 to determine if the updated mesh is geometrically consistent with the geometry and other properties of the CAD model. When the updated mesh is consistent, the CAD model may be provided by the mesh generation system 100 back to the CAE system. When the updated mesh is not consistent, mesh generation system 100 may provide the updated mesh to mesh morphing module 114, for another iteration of a mesh morphing process. In one embodiment, mesh generation system 100 may continue to repeat the mesh morphing process on the updated mesh until the mesh is geometrically consistent with the CAD model.

Mesh generation system 100 includes a FEA module 118 configured to perform finite element analysis on the mesh after the mesh is updated to geometrically conform with the CAD model. The finite element analysis may perform stress, vibration, fatigue, buckling, fluid, and/or thermal analysis using the finite element method. FEA module 118 may perform the finite element analysis without having errors related to a deformation or geometric inconsistency between the mesh and the other properties of the CAD model. FEA module 118, in one embodiment, may indicate a possible geometric inconsistency based on analysis results, and mesh generation system 100 may be configured to modify the mesh as described above.

Mesh generation system 100 is shown to include an interface 120 configured to receive CAD model information from the CAE system. Interface 120 may further be configured to receive any type of user input or other input related to the process of mesh morphing and smoothing.

Figure 2:
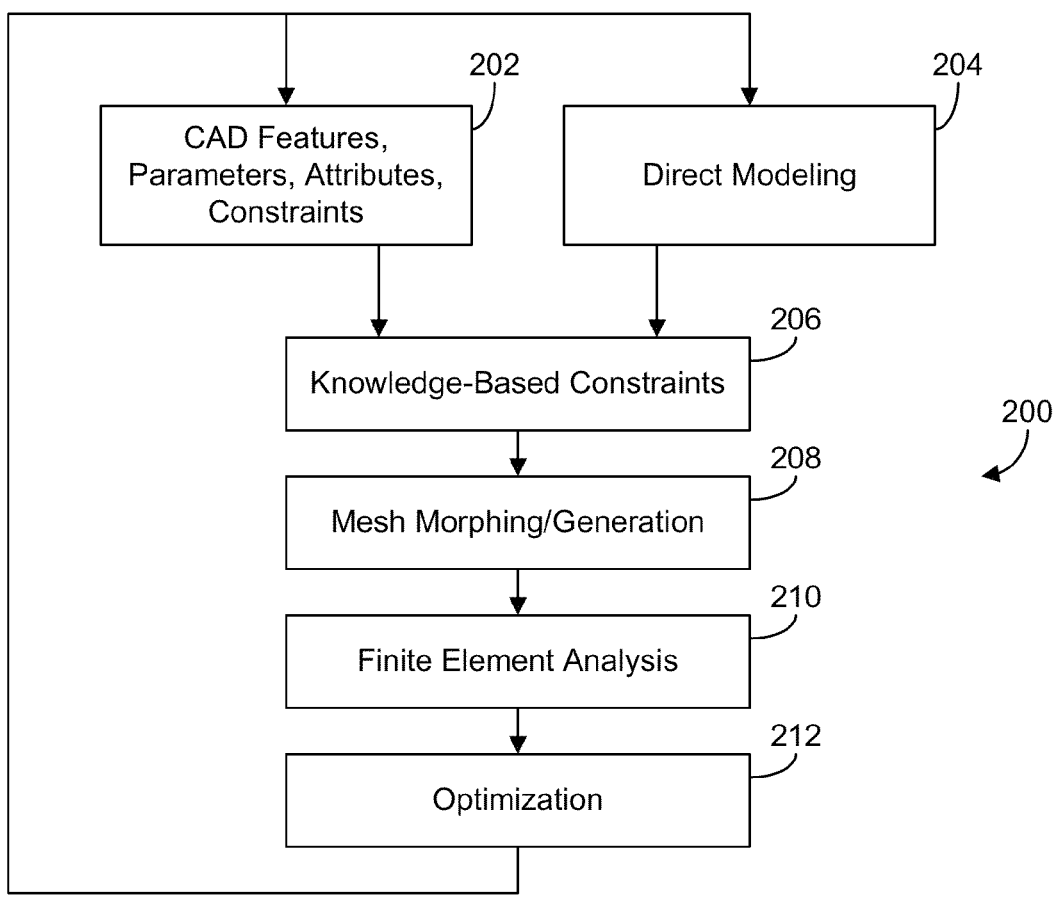
FIG. 2 is a flow chart illustrating an integrated process of designing and modifying a mesh of a CAD model, according to an exemplary embodiment.

Referring now to FIG. 2, a flow chart illustrating an integrated process 200 of designing and modifying a mesh of a CAD model is shown according to one embodiment. Process 200 includes a step 202 where CAD model features, parameters, attributes, and constraints may be defined during the designing process of the CAD model. Process 200 also includes a direct modeling step 204 where the CAD model is designed.

Process 200 includes a knowledge-based constraint step 206. During the designing process of the CAD model, knowledge-based constraints may be used to impose constraints on the design of the CAD model. Knowledge-based constraints may include constraints relating to technical restrictions in the creation of the CAD model in real life, restrictions related to economic or manufacturing limitations, or otherwise. In general, steps 202-206 include the process of CAD model creation, resulting in a geometry, topology, and other features defining the model and a finite element mesh.

Process 200 includes a mesh morphing/generation step 208. At step 208, the finite element mesh of the created CAD model may be morphed and regenerated by, for example, mesh generation system 100, as described above. Once the finite element mesh is updated, finite element analysis may be performed on the CAD model at step 210, and the CAD model may be optimized based on the finite element analysis at step 210. The CAD model may be optimized based on the finite element analysis (e.g., the CAD model is adjusted based on the analysis in order to improve performance or properties of the CAD model in one embodiment).

In certain approaches, the optimized model may be provided back to the finite element analysis step 210 for further analysis and optimization. However, such a process may not account for possible deformation of the finite element mesh during optimization, which may lead to problems during finite element analysis. However, process 200 illustrates the optimized model being provided back to the CAE system and to steps 202-204, where the optimized model is integrated into the entire design process according to one embodiment. The optimized model data may be provided to steps 202-206 for further design, and to the mesh morphing/generation step 208. In other words, the optimized model is checked for geometric consistency between the properties of the model and the finite element mesh. The optimized model may be modified to meet the geometric and manufacturing constraints before it is re-analyzed at finite element analysis step 210. By executing process 200, the CAE system may allow for design of a CAD model where the finite element analysis of the model is not compromised by any deformities or other quality issues related to the mesh when the mesh is optimized based on the finite element analysis.

Figure 3:
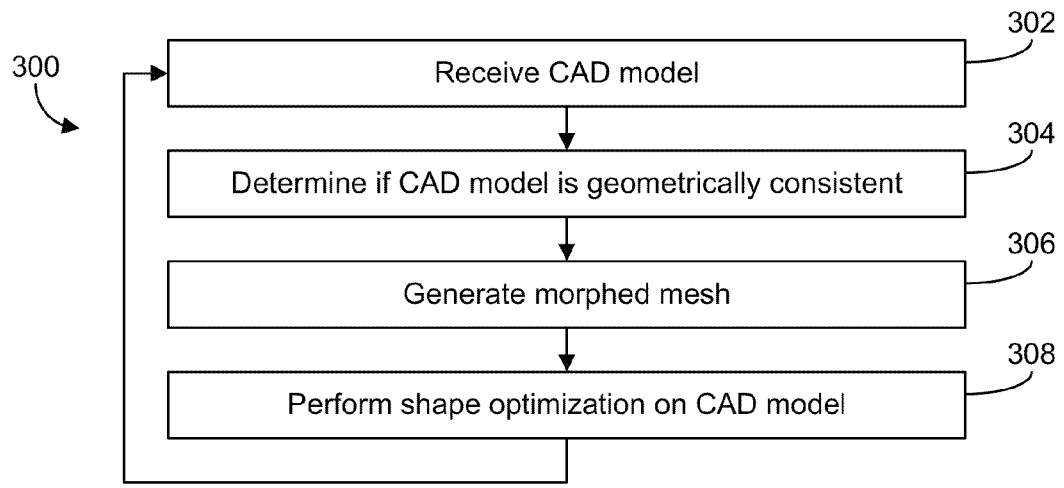
FIG. 3 is a flow chart of a process for performing shape optimization on a CAD model, according to an exemplary embodiment.

Referring now to FIG. 3, a flow chart of a process 300 for performing shape optimization on a CAD model is shown, according to an exemplary embodiment. Process 300 may be executed by, for example, mesh generation system 100.

Process 300 includes receiving a CAD model (step 302). Step 302 may include receiving various data about the created CAD model. For example, CAD model information may include the geometry associated with the parts of the CAD model, a finite element mesh of the CAD model, geometric, manufacturing, and other constraints on the CAD model, and a topology, features, parameters, attributes, and other data about the CAD model.

Process 300 further includes determining whether the CAD model is geometrically consistent (step 304). In one embodiment, step 304 includes comparing the geometry of the CAD model and the finite element mesh of the CAD model, and determining when the two are geometrically consistent. Process 300 may be terminated upon determining that the CAD model is geometrically consistent.

Process 300 further includes generating a morphed mesh (step 306). A geometrically inconsistent CAD model finite element mesh may be altered to be geometrically consistent with the other properties of the CAD model. Step 306 is described in greater detail in FIGS. 4 and 5A-B. Process 300 further includes performing shape optimization on the CAD model (step 308) using the morphed mesh from step 306.

Figure 4:
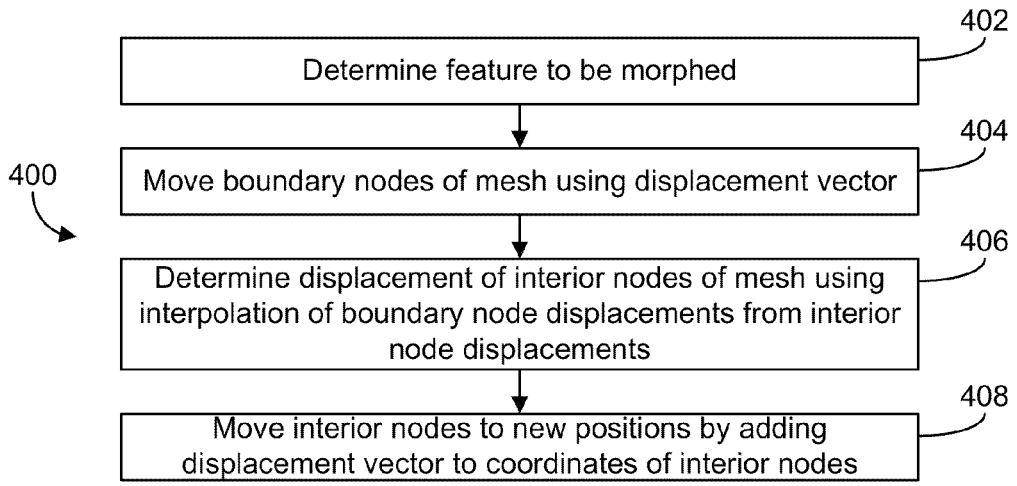
FIG. 4 is a flow chart of a mesh morphing process, according to an exemplary embodiment.

Referring now to FIG. 4, a flow chart of a mesh morphing process 400 is shown, according to an exemplary embodiment. Process 400 may be executed by, for example, a mesh morphing module 114 of a mesh generation system. Process 400 may be executed in order to morph and smooth a finite element mesh of a CAD model. The morphed finite element mesh may be used to perform shape optimization of a CAD model such that the CAD model is geometrically consistent and conforming to geometric, manufacturing, and other constraints. Process 400 may be configured to receive a finite element mesh, including node coordinates, node configurations (e.g., the node is part of a tri mesh, quad mesh, tet mesh, etc.) and other node properties, and may provide updated node coordinates of the finite element mesh back to mesh generation system 100.

Process 400 includes determining a feature to be morphed or changed (step 402). At step 402, a finite element mesh of a CAD model is received. A mesh generation system may be configured to receive the CAD model and associated properties, and may provide the finite element mesh to process 400 for morphing the mesh. For the finite element mesh, node coordinates for each node of the mesh, element connectivity between the nodes (e.g., tri mesh, quad mesh, tet mesh, etc.), and boundary node displacements may be received. The boundary node displacements may be a displacement vector describing a change to the size or other property of the boundary nodes of a shape. The displacement may have a zero value for fixed nodes. Further, an indication of one or more features of the CAD model that are geometrically inconsistent may be received. Referring also to FIG. 5A, step 402 may include receiving mesh 500, including feature 501 and the location of nodes 512, 513, 514, 515.

Step 402 may determine a type of feature that is in the CAD model by analyzing the edges of the CAD model. In some embodiments, the feature determination may include analyzing the distances between consecutive nodes to determine that three or more nodes are at an equal distance and similar direction apart from one another. The nodes that belong to a feature may be moved together during shape optimization.

For example, step 402 may include determining the shape of the feature. In some embodiments, the shape may be elliptical, circular, triangular, or any other type of shape. Step 402 may further include determining feature information, such as a midpoint or central point of the feature that can be used as a reference point when changing positions of the boundary nodes of the feature.

Process 400 further includes moving the boundary nodes of the mesh using a displacement vector (step 404). The boundary nodes may be nodes around the perimeter of the feature that is geometrically inconsistent in the CAD model. The displacement vector may be a vector representative of a change in position of the nodes from the current position to a new position. The size of a feature is to be increased or decreased, the displacement vector defines the movement of each node to create the new size of the feature. In some embodiments, the displacement vector may be added to each node and place each effected node at a new location. Referring also to FIGS. 5A-B, step 404 may include moving boundary nodes 512, 513 from the location shown in FIG. 5A to the location shown in FIG. 5B, using the displacement vector.

Process 400 further includes determining a displacement of the interior nodes of the mesh (step 406). The displacement of the interior nodes may be determined using interpolation of the boundary node displacements compared to the interior node locations. The interpolation may be a weighted displacement interpolation as described below. By using interpolation, the displacement of each interior node may be calculated and added to the displacement vector for the interior nodes. Referring also to FIG. 5A, step 406 may include calculating a displacement of interior nodes 514, 515 using interpolation between interior nodes 514, 515 and boundary nodes 512, 513.

In one embodiment, weighted displacement interpolation may be used to calculate a displacement for an interior node of the mesh. A displacement u may be calculated as follows:

$$u_i^{n+1} = \sum_j \frac{w_j u_j^n}{w_j}.$$

i and j are node indices, n is the iteration number, and $w_j$ is a weighting factor associated with a node $u_j$. For the node $u_i$ in the mesh, the displacement of the node is equal to the summation of the displacements of the nodes connected to node $u_i$, where the displacements of the connecting nodes are first weighted. Only neighboring nodes (or local nodes) to node $u_i$ are used in interpolation to determine the displacement.

The weighting factor $w_j$ for a node $u_j$ may be a uniform weight, a weight proportional to a distance, or an inverse of a distance between the node $u_i$ and node $u_j$. In one embodiment, the weighting factor $w_j$ is a uniform weight for all nodes connected to node $u_i$. In another embodiment, the weighting factor $w_j$ relates to a displacement of node $u_j$ in a previous iteration, or a displacement from step 404. In another embodiment, the weighting factor $w_j$ relates to the inverse of the distance between nodes $u_i$ and $u_j$ after node $u_j$ has been moved in step 404.

The displacement resulting from the weighted displacement interpolation may represent a displacement for the interior node (e.g., where the node should be moved in the mesh. The process may be iterative, according to an exemplary embodiment. For example, in the above equation, the location of boundary nodes in the $n^{th}$ iteration of the process may be used to determine a displacement of interior nodes in an $(n+1)^{th}$ iteration of the process.

Process 400 further includes moving the interior nodes to new positions (step 408). The movement may be made by adding the displacement vector to the coordinates of the interior nodes. The displacement vector may be determined via step 406 as described above.

Referring generally to FIGS. 5A-B, an example mesh 500 is shown that illustrates the mesh morphing process. Mesh 500 of FIG. 5A illustrates a mesh before the mesh is morphed, while mesh 550 of FIG. 5B illustrates the mesh after the mesh has been morphed (e.g., a feature 501 of the mesh has been resized as feature 520, but the two features have fundamentally the same shape). Mesh 500 may be received by a mesh generation system 100, along with geometry information associated with the mesh. A mesh feature may be changed by changing the location of various nodes in mesh 500, and the resulting modified mesh 550 may be provided back to the CAE system.

In FIG. 5A, a mesh 500 is shown with a feature 501 (e.g., a circular feature) and a midpoint 502 of feature 501 that defines the location of the feature. Mesh 500 includes a plurality of nodes, including nodes 512, 513, 514, and 515, in an area 510. Area 510 may represent a region in which the mesh needs to be morphed in order to change a size of feature 501 without compromising the integrity of feature 501. With reference to step 402 of process 400, mesh 500 may be received, along with an identification of feature 501 via midpoint 502, an area 510 to be morphed, and the location of the plurality of nodes 512, 513, 514, and 515.

Nodes 512, and 513 are shown to be boundary nodes in mesh 500. Nodes 512, and 513 are nodes on the perimeter of feature 501. With reference to step 404 of process 400, nodes 512, 513 are boundary nodes that are moved from the position shown in FIG. 5A to the position shown in mesh 550 of FIG. 5B. Boundary nodes 512, and 513 may be moved based on geometry information and center 502 (center of feature 520). In mesh 550, feature 520 is shown as smaller in size, but as the same shape as feature 501 in mesh 500. Boundary nodes 512, 513 maintain their relative position on the boundary of feature 520 as compared to feature 501.

In the embodiment of FIGS. 5A-B, feature 501 is shown as circular, with center 502. The position of nodes 512, and 513 may be changed with reference to midpoint 502. By using the center 502, the shape of feature 501 is maintained, resulting in a feature 520 of mesh 550. In other embodiments, feature 501 may be of any shape, and any reference point or node may be used to determine a position of each boundary node.

Nodes 514, and 515 are shown to be interior nodes in mesh 500. Nodes 514, and 515 are nodes whose position in mesh 500 are related to the position of boundary nodes 512, 513. When the position of nodes 512, and 513 is changed at a step 404 of process 400, the position of nodes 514, and 515 (along with other nodes in area 510) must be changed as well to maintain the geometric consistency in the mesh 500 and the CAD model properties. Moving the nodes relative to other local nodes is computationally efficient.

With reference to step 406 of process 400, the new position of nodes 514, and 515 may be calculated by weighted displacement interpolation. As an example, for node 514, the displacement of the node may be calculated by summing the displacement of boundary nodes 512, and 513, after a weighting factor is applied to the displacement of each node 512, and 513. Each node 512, and 513 may have its own weighting factor. For example, node 512 may have a uniform weighting factor, a weighting factor equal to the displacement of the node in the previous step, or a weighting factor representative of the distance between node 512 and node 514.

As a result of step 406, a displacement vector representing displacements for interior nodes 514, and 515 (and other nodes in area 510) is determined. The location of nodes 514, and 515 may be changed based on the displacement vector, resulting in their new locations as shown in mesh 550 of FIG. 5B. Interior nodes 514, 515 maintain their relative location to boundary nodes 512, and 513, and their relative positioning within an area 510 in which all nodes were displaced as a result of changing the size of feature 501.

Figure 6A:
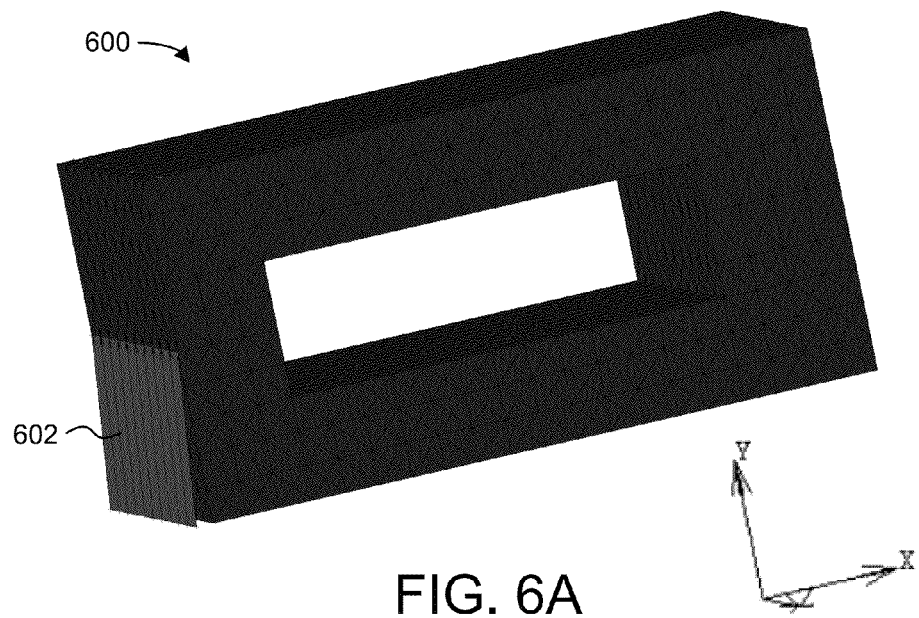
FIG. 6A illustrates an example meshed shape of a CAD model, according to an exemplary embodiment.
Figure 6B:
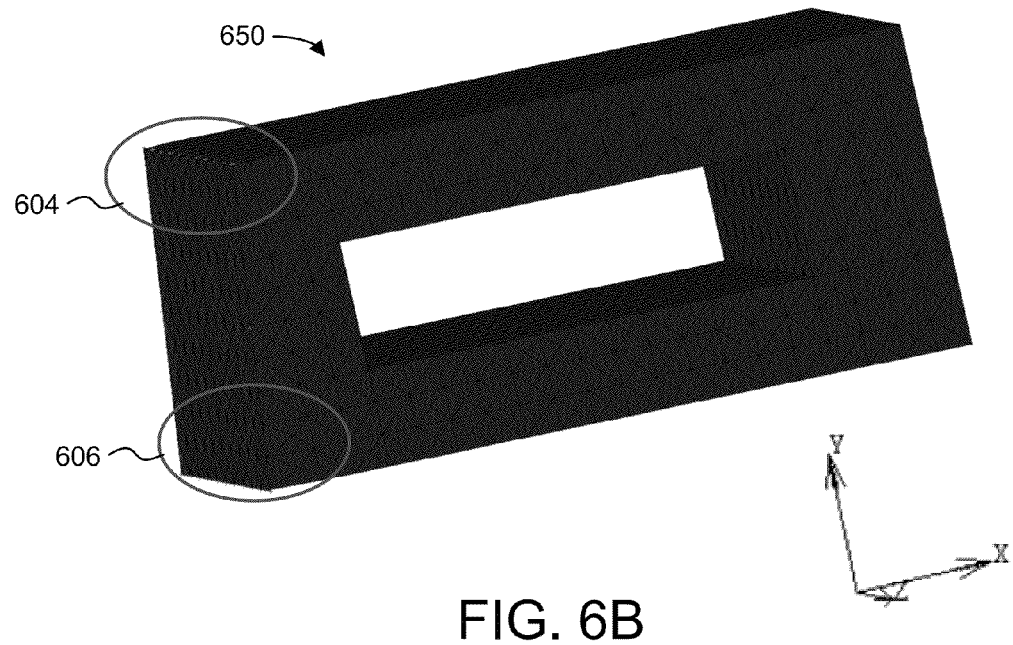
FIG. 6B illustrates an example meshed shape of a CAD model, according to an exemplary embodiment.

Referring to FIGS. 6A-B and 7A-B, example illustrations of mesh distortions in a CAD model during a design and modifying process are shown. CAD model 600 of FIG. 6A is shown with a modification 602 that represents a change on model 600 (e.g., to extend the side of model 600 outwards). The CAE system 100 may receive the input and generate the updated model 650. However, two areas 604, 606 with distortion is illustrated. The finite element mesh in areas 604, 606 are shown as deformed or having poor quality. The systems and methods herein may be used to improve the quality of the finite element mesh in areas 604, 606 and other areas where the mesh is changed based on a modification such as modification 602.

Figure 7A:
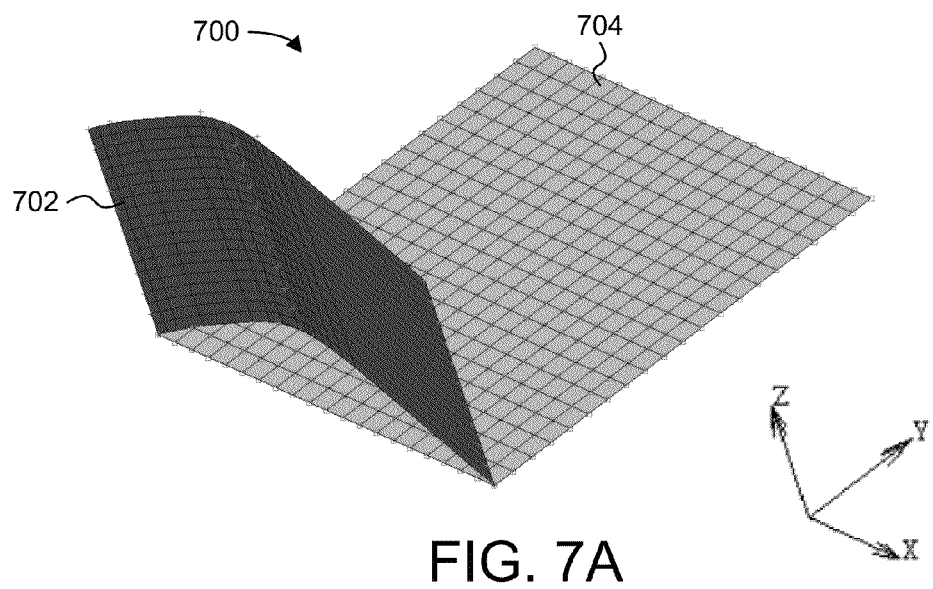
FIG. 7A illustrates an example meshed shape of a CAD model, according to an exemplary embodiment.
Figure 7B:
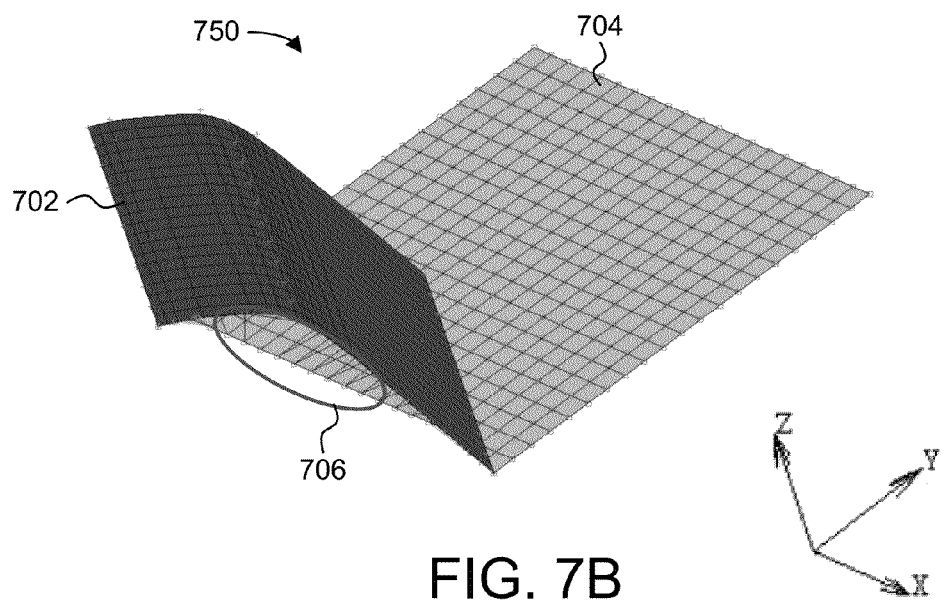
FIG. 7B is an example illustration of mesh distortions in a CAD model during a design and modifying process, according to an exemplary embodiment.

Similarly, CAD model 700 of FIG. 7A is shown with a first portion 702 and second portion 704. Portions 702, 704 may contact each other, resulting in CAD model 750 of FIG. 7B. The mesh of portion 704 is shown as distorted in area 706. The systems and methods herein may be used to improve the quality of the finite element mesh of portion 704.

Figure 8A:
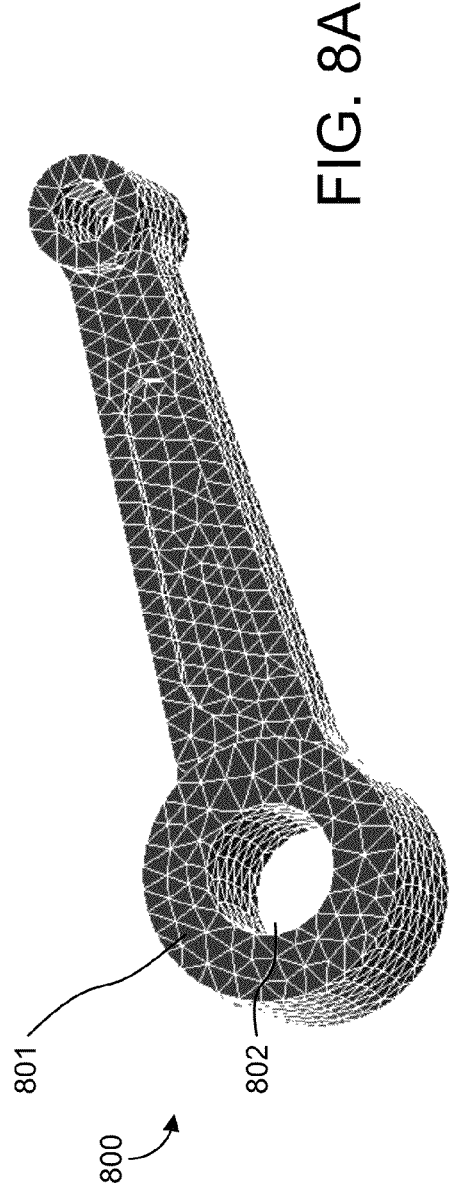
FIG. 8A illustrates an example meshed shape of a CAD model, according to an exemplary embodiment.
Figure 8B:
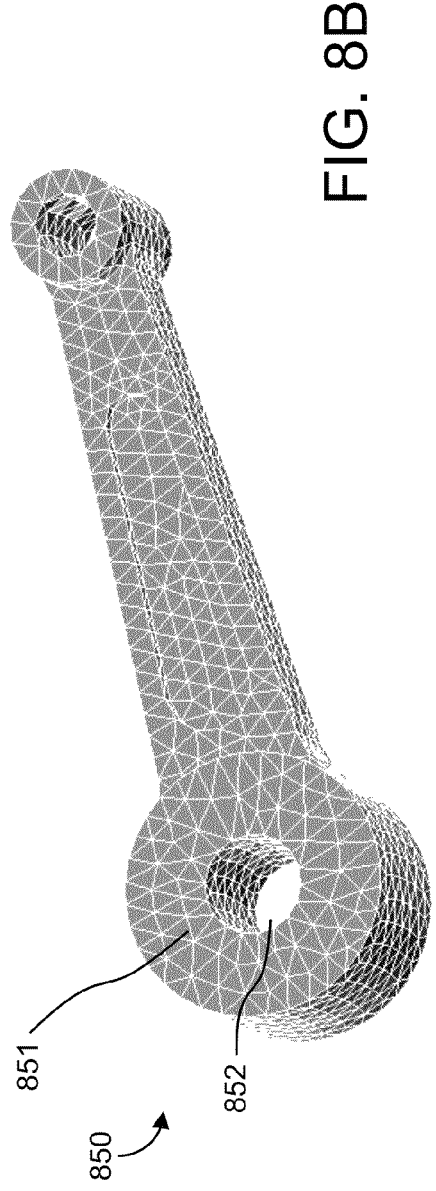
FIG. 8B illustrates an example morphed mesh shape of the CAD model from FIG. 8A, according to an exemplary embodiment.

Referring to FIGS. 8A-B and 9A-B, example CAD models illustrating a mesh morphing process are shown. CAD model 800 of FIG. 8A is shown with a circular feature 801 that may need to be changed to meet a design goal. The shape optimization module 116 may determine that the circular feature 801 may be improved by reducing the radius 802 of the circular feature 801 while retaining the outer boundary of the circular feature 801. In order to reduce the radius 802 the shape optimization module 116 may determine the location of the nodes that are located at the internal edge of the circular feature 801. The nodes at the internal edge (i.e. boundary nodes) of the circular feature 801 may each be moved toward the center of the circular feature 801. After determining the vectors for the movement of the boundary nodes, the displacement of the interior nodes of the mesh may be determined based on the interpolation of the boundary node displacement. The interior nodes may be moved to new positions by adding the displacement vectors.

In another embodiment, a user of the CAE system may wish to minimize the size of the circular feature 801, the user may make the proper changes in the CAD model. The mesh generation system 100 may be configured to receive the changes and to morph and smooth the finite element mesh of the CAD model based on a shape optimization algorithm. The result is shown as CAD model 850 of FIG. 8B, with circular feature 851 smaller than circular feature 801. The mesh pattern around radii 802 and 852 are shown to be consistent in pattern with one another.

Figure 9B:
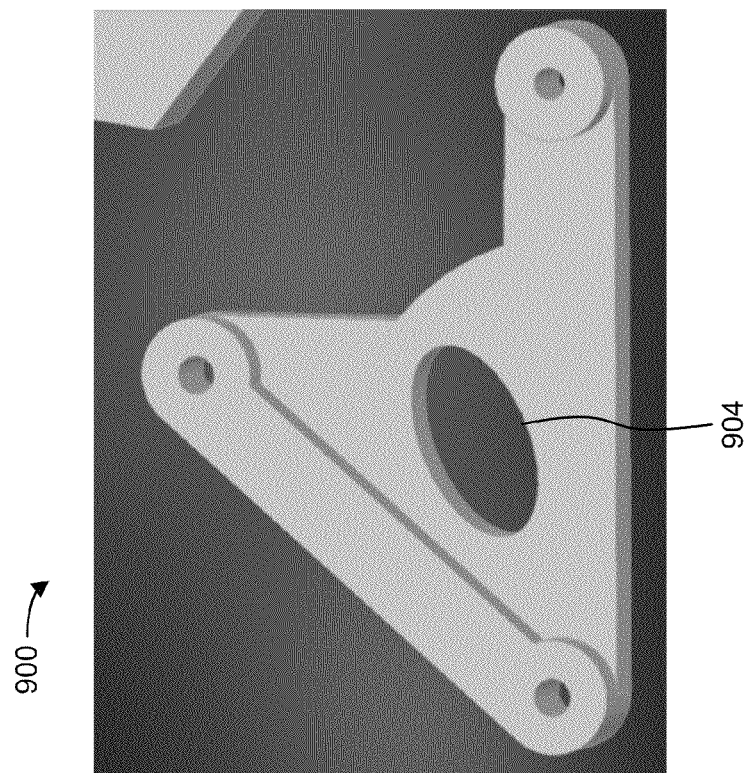
FIG. 9B illustrates an example CAD model from FIG. 9A illustrating a mesh morphing process, according to an exemplary embodiment.
Figure 9A:
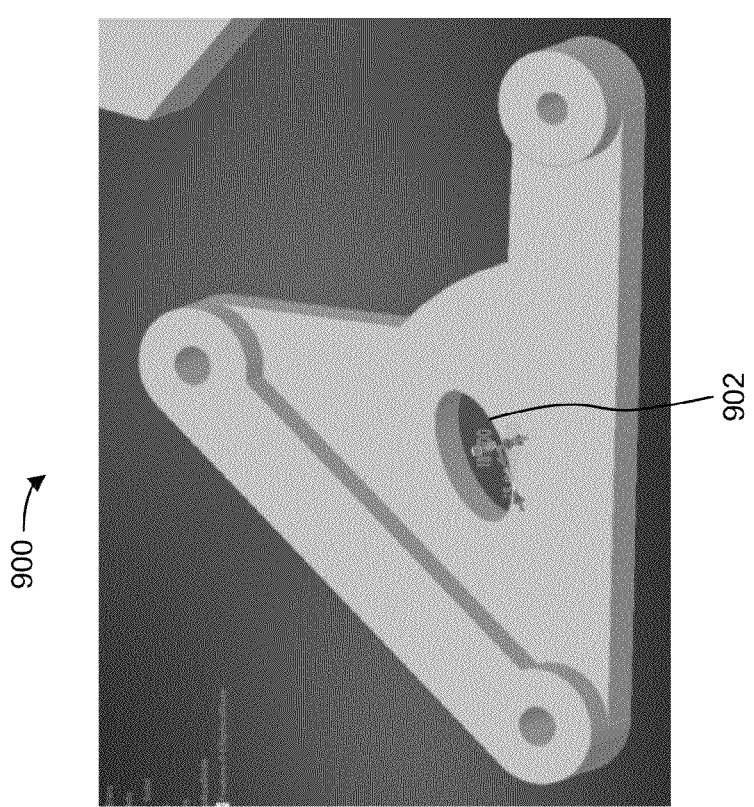
FIG. 9A illustrates an example CAD model for shape optimization.

Similarly, CAD model 900 of FIG. 9A is shown with an elliptic hole feature 902. CAD model 900 may have various constraints and design variables to be maintained. For example, model 900 may have a constraint relating to a stress on feature 902 (e.g., a Von Mises stress) and a major axis and minor axis design variables that define the size and shape of elliptic hole feature 902. CAD model 900 may have an objective function of minimizing the weight of model 900. In other words, the CAE system 100 may be configured to minimize the weight of model 900 while maintaining the shape, feature 902, and the major axis and minor axis, while keeping the stress level on feature 902 below a predetermined threshold. Referring to FIG. 9B, CAD model 900 is shown with a larger elliptic hole feature 904 that maintains the shape of the feature and the design variables and constraints. The elliptical hole feature 902 may be increased in size by moving the boundary nodes away from the radii of the elliptical shape.

Alternative embodiments may includes, a system and method includes receiving a CAD model that represents one or more physical objects to be manufactured, the CAD model comprising a finite element mesh, geometric parameters of the CAD model, geometric constraints, and manufacturing constraints, determining if the finite element mesh and geometric parameters of the CAD model are geometrically consistent. The method further includes performing shape optimization by generating a morphed mesh that results in an updated finite element mesh, and generating a morphed mesh by determining a displacement of interior nodes of the finite element mesh using an interpolation of boundary node displacements.

The terms "module", "system", "logic", "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. The results of analysis by system 10 can be provided in reports or displayed in accordance with CAE and CAD operations. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for shape optimization, comprising:
    receiving information regarding a model that represents one or more physical objects to be manufactured, the information comprises a finite element mesh, geometric parameters, geometric constraints, and manufacturing constraints of the model;
    generating a morphed mesh that results in an updated finite element mesh in order to meet specified model characteristics;
    wherein generating the morphed mesh comprises:
        displacing nodes located at boundary regions of the model;
        determining a displacement of interior nodes of the finite element mesh using an interpolation of boundary node displacement;
        moving boundary nodes of the finite element mesh using a displacement vector representative of geometric inconsistencies; and
        moving the interior nodes to new positions by adding the displacement vector to coordinates of the interior nodes.

2. The method of claim 1, wherein generating the morphed mesh further comprises:
    maintaining geometric constraints of the morphed mesh to be the same as the finite element mesh.

3. The method of claim 1, wherein the interpolation is a weighted displacement interpolation from the boundary node displacements.

4. The method of claim 3, wherein a weighted factor of the interpolation is one of: a uniform weighted factor, proportional to a distance of displacement, or an inverse of distance of displacement.

5. The method of claim 1, wherein the morphed mesh complies with the manufacturing constraints of the model.

6. The method of claim 2, wherein the morphed mesh may be formed of a mix of one or more of a triangular, tetrahedral, quadrilateral, prism, and hexahedral elements.

7. The method of claim 1, wherein the boundary node displacement corresponds to the nodes located at the boundary regions.

8. The method of claim 1, wherein the specified model characteristics correspond to the information received.

9. A mesh generation system, comprising a processing circuit configured to:
   receive information regarding a model that represents one or more physical objects to be manufactured, the information comprises a finite element mesh, geometric parameters, geometric constraints, and manufacturing constraints of the model;
   generate a morphed mesh resulting in an updated finite element mesh to meet specified model characteristics;
   wherein generating the morphed mesh comprises:
      displacing nodes located at boundary regions of the model;
      determining a displacement of interior nodes of the finite element mesh using an interpolation of boundary node displacement;
      moving boundary nodes of the finite element mesh using a displacement vector representative of geometric inconsistency; and
      moving the interior nodes to new positions by adding the displacement vector to coordinates of the interior nodes.

10. The mesh generation system of claim 9, wherein the processing circuit is configured to repeat updating the finite element mesh using a previous updated finite element mesh.

11. The mesh generation system of claim 9, wherein the interpolation is a weighted displacement interpolation from the boundary node displacements.

12. The mesh generation system of claim 11, wherein the weighted displacement interpolation uses one of: a uniform weighted factor, proportional to a distance of displacement, or an inverse of the distance of displacement.

13. The mesh generation system of claim 8, wherein the updated finite element mesh complies with the geometric constraints and manufacturing constraints of the model.

14. The mesh generation system of claim 9, wherein the method is repeated until the updated finite element mesh complies with the geometric constraints and manufacturing constraints of the model.

15. A non-transitory computer-readable storage medium having machine instructions stored therein, the instructions being executable by a processor to cause the processor to perform operations comprising:
   receiving information regarding a model that represents one or more physical objects to be manufactured, the information comprises a finite element mesh, geometric parameters, geometric constraints, and manufacturing constraints of the model;
   generating a morphed mesh to provide an updated finite element mesh in order to meet specified model characteristics;
   wherein generating the morphed mesh comprises:
   displacing nodes located at boundary regions of the model;
   determining a displacement of interior nodes of the finite element mesh using an interpolation of boundary node displacement;
   moving boundary nodes of the finite element mesh using a displacement vector representative of geometric inconsistencies; and
   moving the interior nodes to new positions by adding the displacement vector to coordinates of the interior nodes.

16. The non-transitory computer-readable storage medium of claim 15, wherein the operations are repeated using the updated finite element mesh.

17. The non-transitory computer-readable storage medium of claim 15, wherein the interpolation is a weighted displacement interpolation from the boundary node displacements.

18. The non-transitory computer-readable storage medium of claim 17, wherein the weighted factor of the interpolation is one of: a uniform weighted factor, proportional to a distance of displacement, or an inverse of distance of displacement.

19. The non-transitory computer-readable storage medium of claim 15, wherein the updated finite element mesh complies with the geometric constraints and manufacturing constraints of the model.

* * * * *